May 7, 1957
J. A. CHILMAN ET AL
2,791,701
LOAD-SHARE RESPONSIVE DEVICE FOR PARALLELED
SYSTEMS OF THREE-PHASE ALTERNATORS
Filed Oct. 10, 1955
2 Sheets-Sheet 1

INVENTORS
J. A. CHILMAN,
A. G. MAPP +
J. CRIPPS
By Wilkinson + Mawhinney
ATTYS

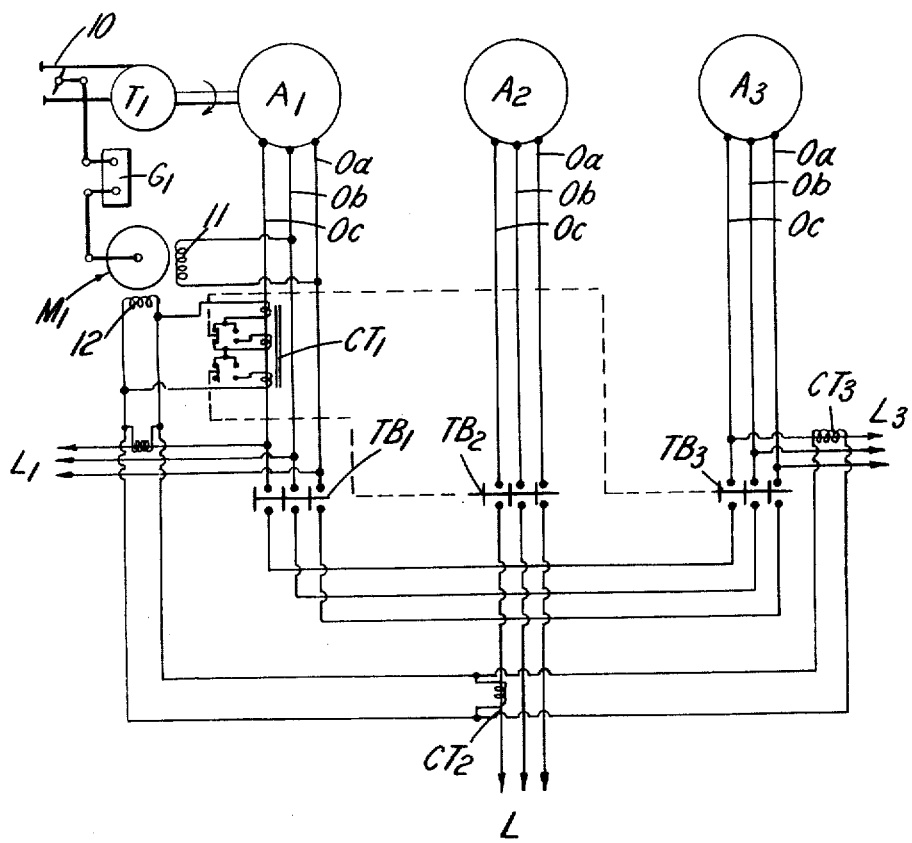

United States Patent Office 2,791,701
Patented May 7, 1957

2,791,701

LOAD-SHARE RESPONSIVE DEVICE FOR PARALLELED SYSTEMS OF THREE-PHASE ALTERNATORS

John Alfred Chilman, Alfred George Mapp, and John Cripps, Gloucester, England, assignors to Rotol Limited, Gloucester, England, a British company Application October 10, 1955, Serial No. 539,584

6 Claims. (Cl. 307—57)

This invention relates to load share responsive devices for the alternators of a three phase alternating current system of the kind (hereinafter referred to as the kind described) including at least two alternators connected in parallel and driven by separate prime movers.

In British Patent No. 732,052 there is described a system of the kind described in which power control means for the prime mover driving each alternator is coupled to a two-phase induction motor one phase-winding of which is connected between first and second phase lines of the output of the associated alternator and the other phase winding of which is connected in series with (a) the secondary of a current transformer in the third phase line of the output of the said associated alternator, and (b) with the secondary of a current transformer in the third phase of each load line. In this arrangement the voltage induced in the secondary of the first-mentioned current transformer is opposed by the sum of the voltages induced in the secondaries of the load-line current transformers, and the system is arranged to stabilise itself in the load distribution condition in which these opposed voltages are equal and no torque is produced by the two-phase induction motors.

The object of the present invention is to provide an improvement in or a modification of the system described in the above mentioned British patent which is less subject to inaccuracies of operation due to phase differences between the primary currents and the secondary voltages of the current transformers used in the system.

According to the present invention load control means for an alternator in a three-phase system of the kind described comprises a two-phase induction motor coupled to power control means for the prime mover of the said alternator, one phase winding of the said motor being connected between first and second phase lines of the output of the said alternator, and the other phase-winding of the said motor being connected across the secondary of a current transformer in the third phase line of the output of the said alternator, and, in opposition to the energisation thereby produced, across the secondary or each of the individual secondaries of one or more current transformers in the third phase lines of the system such that the primary current or the sum of the primary currents of the last mentioned transformer or transformers is equal to the sum of the currents supplied to the system by all the alternators, or all the other alternators, the transformation ratios of all said current transformers being selected so that said other phase winding remains unenergised when said alternator is taking its desired share of the total load.

This arrangement differs principally from the arrangement described in the specification accompanying the above mentioned application in that the second phase-winding of the two phase motor and the secondaries of each of the current transformers are connected together in parallel instead of in series. In this way the currents induced in the transformer secondaries are added algebraically instead of the voltages, and the question of phase errors occurring between the primary currents and the secondary voltages does not arise.

In one form of the present invention, applicable to a system including a line section carrying the whole of the load currents, the said other phase-winding of the two-phase motor is connected across the secondary of a current transformer in said third phase line of the output of said alternator and, in opposition to the energisation thereby produced, across the secondary of a current transformer in the third phase line of said line section carrying the whole of the load currents.

In another form of the present invention, applicable to a system in which there is no single line section carrying the whole of the load currents, the said other phase-winding of the two-phase motor is connected across the secondary of a current transformer in said third phase line of the output of said alternator and, in opposition to the energisation thereby produced, across the secondary of a current transformer in the third phase line of the output of each other alternator.

In each form of the invention it is to be understood that each or some of the other alternators of the system may, and would usually, also be provided with similar load control means whereby the load is apportioned in a desired manner between all the alternators paralleled at a given time.

By way of example only the three embodiments of the present invention will now be described with reference to the accompanying drawings whereof:

Figure 3 shows yet another form of the invention.

Figure 1:
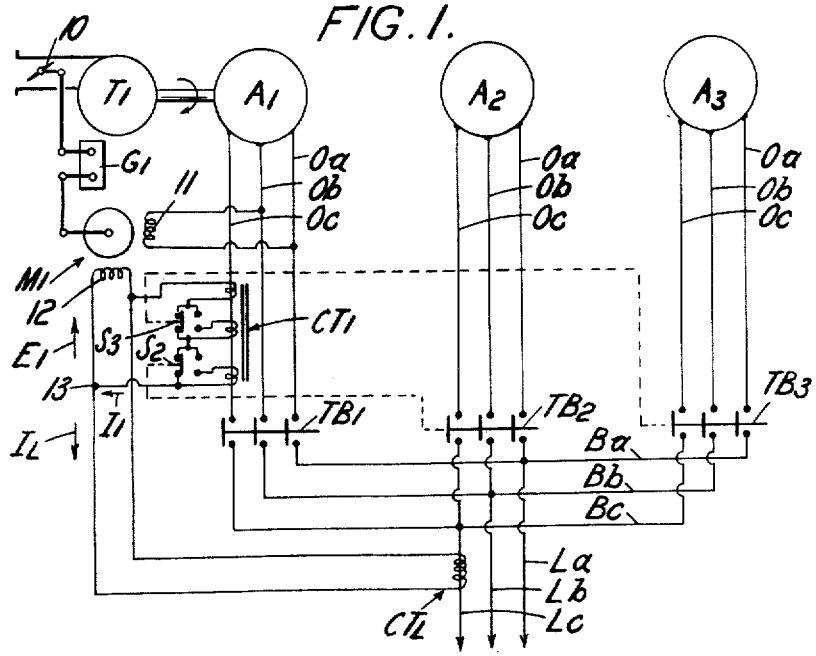
Figure 1 shows diagrammatically one form of the invention.

Referring to Figure 1, a three phase system comprises three alternators $A_1$, $A_2$ and $A_3$ each with output lines $Oa$, $Ob$ and $Oc$, the alternators being arranged for connection in parallel to tie bars $Ba$, $Bb$, and $Bc$ by switch gear in the form of tie-breaker switches $TB_1$, $TB_2$ and $TB_3$. In the system now being described all the loads are connected to the tie bars through a common line section $La$, $Lb$ and $Lc$. Each alternator is driven by an air turbine, of which only the turbine $T_1$ driving the alternator $A_1$ is shown. The throttle valve 10 of the turbine $T_1$ is controlled by a variable datum governor $G_1$ itself controlled as to datum, by a two-phase induction motor $M_1$. One phase-winding 11 of the motor $M_1$ is connected between the phase lines $Oa$ and $Ob$ of the output of the alternator $A_1$ and the other phase-winding 12 is connected across the secondary of a current transformer $CT_1$ in the third phase line $Oc$ of the output of the alternator $A_1$, and, in opposition to the energisation thereby produced, across the secondary of a current transformer $CT_L$ in the third phase line $Lc$ of the line section carrying the whole of the load current.

If, at a particular instant, the current induced in the secondary of $CT_1$ is represented by the arrow $I_1$, this would, in the absence of the transformer $CT_L$, excite the phase-winding 12 in the sense of the arrow $E_1$. The transformer $CT_L$ is arranged so that at the same instant current flows through its secondary in the direction represented by the arrow $I_L$, corresponding to excitation of the winding 12 in the opposite sense in the absence of the transformer $CT_1$. Since, with both transformers connected, the algebraic sum of the currents arriving at the common connection point 13 is zero, the excitation current flowing through the winding 12 is equal to the difference between the secondary currents of the transformers. The motor $M_1$ controls the power output of the turbine $T_1$ to maintain a load on the alternator $A_1$ corresponding to zero excitation of the winding 12. In this condition the secondary currents of the transformers $CT_1$ and $CT_L$ are equal and the impedance of their external circuits is low, so that the secondary currents are proportional in magnitude and are in phase agreement with the primary currents.

By suitably choosing the transformation ratio of the transformer $CT_1$ relatively to that of the transformer $CT_L$ it is possible to select the proportion of the total load which will be carried by the alternator $A_1$. Supposing, for example that all three alternators are of equal capacity, when they are all paralleled the alternator $A_1$ should carry one third of the total load and the transformer $CT_1$ should have a transformation ratio three times that of the transformer $CT_L$. Supposing the alternator $A_2$ or $A_3$ to be detached from the system by the opening of the tie-breaker switch $TB_2$ or $TB_3$, the alternator $A_1$ will now have to carry half the total load and the ratio of the transformer $CT_1$ should be changed to twice that of the transformer $CT_L$. For this purpose switch means comprising switches $S_2$ and $S_3$ are provided which are closed respectively when the tie-breaker switches $TB_2$ and $TB_3$ are opened and which open-circuit appropriate parts of the secondary of the transformer $CT_1$ to bring its ratio to the required value.

The load control means shown in Figure 1 serves to determine the proportion of the total load which shall be carried by the alternator $A_1$ but does not determine how the remainder shall be divided between the alternators $A_2$ and $A_3$. To achieve this further control similar load control means may be provided for either of the alternators $A_2$ or $A_3$.

Figure 2:
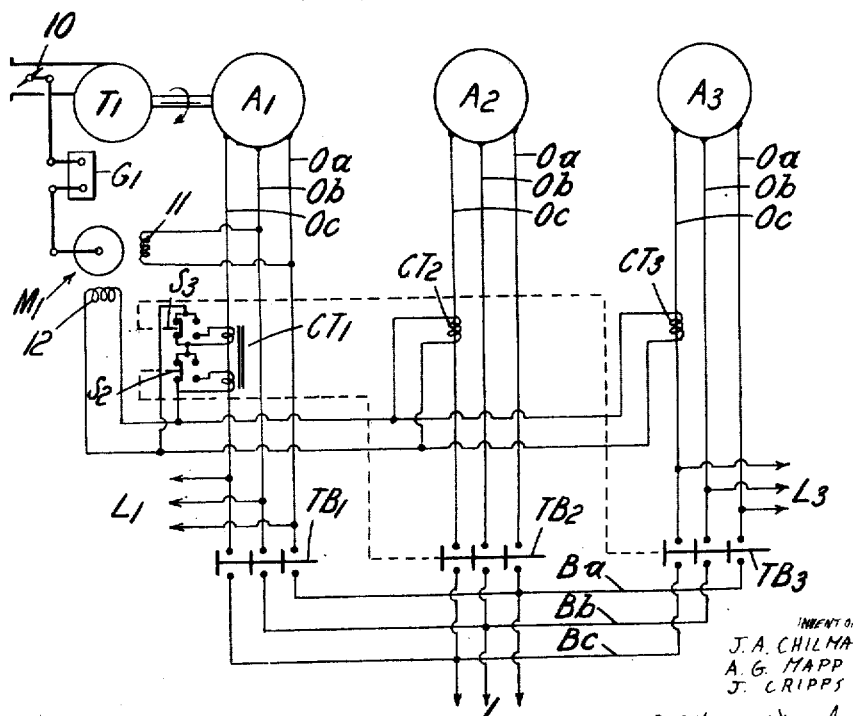
Figure 2 shows another form of the invention.

Figure 2 shows one method of applying the invention to a three-alternator system similar to that of Figure 1 except that the alternators $A_1$ and $A_3$ also carry individual loads $L_1$ and $L_3$ in addition to the load L supplied from the tie bars so that there is no line section carrying the whole of the load current in which a current transformer such as $CT_L$ of Figure 1 can be arranged.

In this arrangement the phase-winding 12 of the two phase motor $M_1$ is connected across the secondary of a current transformer $CT_1$ in the phase line $O_C$ of the output of the alternator $A_1$ (the figure showing only the load-controlling means for this alternator) and, in opposition to the energisation thereby produced across the individual secondaries $CT_2$ and $CT_3$ of current transformers in the phase lines $O_C$ of the outputs of each of the other alternators $A_2$ and $A_3$. Since in this case the current induced in the secondary $CT_1$ is equated to the sum of the currents induced in the secondaries $CT_2$ and $CT_3$, which are proportional to the supply currents of the alternators $A_2$ and $A_3$, instead of being equated to a current proportional to the total load as in Figure 1, it is clear that the transformation ratio of the transformer $CT_1$ in relation to those of $CT_2$ and $CT_3$ will be 2:1 instead of 3:1 for the case in which all the alternators are of equal capacity.

More generally, if the alternator supply currents are denoted by $I_1$, $I_2$ and $I_3$ the stabilisation condition of Figure 1 is represented by:

$$AI_1 = B(I_1+I_2+I_3)$$

where A is the transformation ratio of $CT_1$ and B is the transformation ratio of $CT_L$, whence $$\frac{A}{B} = \frac{I_1+I_2+I_3}{I_1} = 3 \text{ when } I_1=I_2=I_3$$

For Figure 2 the stabilisation condition is represented by $$AI_1 = CI_2 + DI_3$$

where C and D are the transformation ratios of $CT_2$ and $CT_3$ respectively.

For the case in which $I_1=I_2=I_3$ and C and D are equal to E $$\frac{A}{E} = \frac{I_2+I_3}{I_1} = 2$$

When either of the tie-breaker switches $TB_2$ or $TB_3$ is opened to isolate one of the alternators $A_2$ or $A_3$ from the network, it is necessary to adjust the transformation ratio of the transformer $CT_1$ accordingly, this being done in the arrangement of Figure 2 by switch means comprising switches $S_2$ and $S_3$ linked with $TB_2$ and $TB_3$ respectively which short circuit appropriate parts of the secondary winding of $CT_1$.

Instead of the transformers $CT_2$ and $CT_3$ in Figure 2 it is of course possible to use a current transformer in the corresponding phase line of each load L, $L_1$ and $L_3$ since the total of the load currents is equal to the total of the supply currents. In this case, for a system with alternators of equal capacity, the ratio of the transformer $CT_1$ will be three times that of the other transformers as in Figure 1. The system just described is illustrated in Figure 3.

We claim:

1. In a paralleled system of three phase alternators comprising at least two alternators driven each by a separate prime mover, load control means for an alternator of the system, said load control means comprising power control means for the prime-mover of the said alternator, a two-phase induction motor coupled to adjust said power control means, one phase winding of said motor being connected between first and second phase lines of the output of the said alternator, a current transformer in the third phase line of the output of the said alternator, said current transformer having a secondary winding connected in parallel with the other phase winding of said motor, current transformer means in at least one other third phase line of the system such that the sum total of primary current of said current transformer means is equal to the sum of the current supplied to the system by at least all said other alternators, said further current transformer means having all its secondary windings connected each in parallel with said other phase winding of said motor in opposition to the energisation produced in said other phase winding of said motor by said current transformer, and the transformation ratios of said current transformer and said current transformer means being so selected that said other phase winding of said two-phase induction motor remains unenergised when the said alternator is taking its desired share of the total load.

2. Load control means as claimed in claim 1, wherein the ratio of the transformation ratios of said currrent transformer and said current transformer means is adjustable to alter the load share taken by the said alternator.

3. The combination with a paralleled system of three-phase alternators comprising more than two alternators; of, for at least one of the alternators, a load control means as claimed in claim 2; for each of the other alternators at least, switch gear for connecting and disconnecting the alternator to and from the paralleled system; and switch means for simultaneously adjusting the transformation ratio of the current transformer in the third phase line of said one alternator when the switch gear pertaining to any one of said other alternators is operated to alter the load share taken by said one alternator.

4. The combination as claimed in claim 3, wherein said switch means comprises switches for switching in and out secondary winding turns of the current transformer in the third phase line of said one alternator, each switch of said switch means being connected for operation by the switch gear pertaining to one of said other alternators, so that when one is open the other is closed and vice versa.

5. In a paralleled system of three phase alternators comprising at least two alternators driven each by a separate prime-mover, load-control means for an alternator of the system, said load control means comprising power control means for the prime-mover of the said alternator, a two-phase induction motor coupled to adjust said power control means, one phase winding of said motor being connected between first and second phase lines of the output of the said alternator, a current transformer in the third phase line of the output of the said alternator, said current transformer having a secondary winding connected in parallel with the other phase winding of said motor, a further current transformer in the third phase line of the output of each of the other alternators, said further current transformers each having a secondary winding connected in parallel with said other phase winding of said motor in opposition to the energisation produced in said other phase winding of said motor by the current transformer in the third phase line of the output of the said alternator, and the transformation ratios of all said current transformers being so selected that said other phase winding of said two-phase induction motor remains unenergised when the said alternator is taking its desired share of the total load.

6. In a paralleled system of three phase alternators comprising at least two alternators driven each by a separate prime-mover, the system including a line section carrying the whole of the load currents, load control means for an alternator of the system, said load control means comprising power control means for the prime-mover of the said alternator, a two-phase induction motor coupled to adjust said power control means, one phase winding of said motor being connected between first and second phase lines of the output of the said alternator, a current transformer in the third phase line of the output of the said alternator, said current transformer having a secondary winding connected in parallel with the other phase winding of said motor, a further current transformer in the third phase line of said line section carrying the whole of the load currents, said further current transformer having a secondary winding connected in parallel with said other phase winding of said motor in opposition to the energisation produced in said other phase winding of said motor by the current transformer in the third phase line of the output of the said alternator, the transformation ratios of said current transformers being so selected that said other phase winding of said two phase induction motor remains unenergised when the said alternator is taking its desired share of the total loads.

References Cited in the file of this patent

UNITED STATES PATENTS

| | | |
|---|---|---|
| Re. 20,548 | Doyle | Nov. 9, 1937 |
| 2,501,340 | Kresser | Mar. 21, 1950 |
| 2,504,768 | Watson et al. | Apr. 18, 1950 |
| 2,710,355 | Chilman et al. | June 7, 1955 |

FOREIGN PATENTS

| | | |
|---|---|---|
| 653,994 | Great Britain | May 30, 1951 |
| 732,052 | Great Britain | June 15, 1955 |

UNITED STATES PATENT OFFICE
CERTIFICATE OF CORRECTION

Patent No. 2,791,701                                                                    May 7, 1957

John Alfred Chilman et al.

It is hereby certified that error appears in the above numbered patent requiring correction and that the said Letters Patent should read as corrected below.

In the heading to the printed specification, between lines 8 and 9, insert -- Claims priority, application Great Britain October 11, 1954 --.

Signed and sealed this 22nd day of October 1957.

(SEAL)
Attest:

KARL H. AXLINE                                               ROBERT C. WATSON
Attesting Officer                                           Commissioner of Patents